(12) United States Patent
Lagors et al.

(10) Patent No.: US 11,565,729 B2
(45) Date of Patent: Jan. 31, 2023

(54) BRAKING SYSTEM FOR A RAILWAY VEHICLE

(71) Applicant: FAIVELEY TRANSPORT AMIENS, Amiens (FR)

(72) Inventors: Frédéric Lagors, Serpaize (FR); Quentin Negrello, Villeneuve Saint Salves (FR); Guillaume Crosnier, Rosieres en Santerre (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 275 days.

(21) Appl. No.: 16/771,891

(22) PCT Filed: Dec. 11, 2018

(86) PCT No.: PCT/FR2018/053180
§ 371 (c)(1),
(2) Date: Jun. 11, 2020

(87) PCT Pub. No.: WO2019/115925
PCT Pub. Date: Jun. 20, 2019

(65) Prior Publication Data
US 2021/0070329 A1 Mar. 11, 2021

(30) Foreign Application Priority Data
Dec. 15, 2017 (FR) ...................................... 1762249

(51) Int. Cl.
*B61H 5/00* (2006.01)
*B60T 8/17* (2006.01)
(Continued)

(52) U.S. Cl.
CPC .............. *B61H 5/00* (2013.01); *B60T 8/1705* (2013.01); *B60T 13/686* (2013.01);
(Continued)

(58) Field of Classification Search
CPC ..... B60T 8/1705; B60T 15/022; B61H 13/20; F16K 31/0689
See application file for complete search history.

(56) References Cited

FOREIGN PATENT DOCUMENTS

| CN | 101020457 A | 8/2007 |
|---|---|---|
| CN | 101885327 A | 11/2010 |

(Continued)

OTHER PUBLICATIONS

International Search Report, dated Mar. 3, 2019, from corresponding PCT application No. PCT/FR2018/053180.

*Primary Examiner* — Melanie Torres Williams
(74) *Attorney, Agent, or Firm* — The Small Patent Law Group LLC; Christopher R. Carroll

(57) ABSTRACT

Disclosed is a railway braking system including a control device having a valve with a body having a cavity and a slide having an internal chamber, supply notches and drainage notches each having an overall passage cross-section for a pressure medium having a shape exhibiting an apex, and being movably mounted in the cavity, between a supply position where the supply notch is opposite a supply groove of the body, and a drainage position where the drainage notch is opposite a drainage groove of the body; the device being configured to allow a substantially stable control configuration, wherein the pressure value of the medium is limited, and wherein the slide is positioned in the cavity such that a control notch of the slide is opposite a control groove of the body while the supply and drainage notches are respectively at a distance from the supply and drainage grooves.

20 Claims, 9 Drawing Sheets

Fig. 5

(51) Int. Cl.
  *B60T 13/68* (2006.01)
  *B60T 15/02* (2006.01)
  *B61H 13/20* (2006.01)
  *F16K 11/07* (2006.01)
  *F16K 31/06* (2006.01)

(52) U.S. Cl.
  CPC .......... *B60T 15/022* (2013.01); *B61H 13/20* (2013.01); *F16K 11/0716* (2013.01); *F16K 31/0613* (2013.01); *F16K 31/0689* (2013.01)

(56) References Cited

FOREIGN PATENT DOCUMENTS

| | | | | |
|---|---|---|---|---|
| CN | 102180160 | A | 9/2011 | |
| CN | 203906431 | U * | 10/2014 | |
| CN | 104329487 | A * | 2/2015 | .......... F16K 11/0716 |
| CN | 104533863 | A | 4/2015 | |
| CN | 105459995 | A | 4/2016 | |
| CN | 206155260 | U | 5/2017 | |
| DE | 3413866 | A1 * | 11/1984 | |
| DE | 9114043 | U1 | 2/1992 | |
| DE | 102007010213 | B3 * | 8/2008 | ............ B60T 8/3665 |
| EP | 2371642 | A1 | 10/2011 | |
| EP | 2826683 | A1 | 1/2015 | |
| FR | 3005133 | A1 | 10/2014 | |
| FR | 3027270 | A1 | 4/2016 | |
| RU | 2625474 | C2 | 7/2017 | |
| SU | 71537 | A1 | 11/1947 | |
| SU | 95053 | A1 | 11/1952 | |

* cited by examiner

BRAKING SYSTEM FOR A RAILWAY VEHICLE

FIELD OF THE INVENTION

The invention concerns the field of braking for rail vehicles and more particularly rail transport braking systems for rail vehicles provided with a service brake and/or a parking brake configured to be supplied by a source of pressure agent so as to act on braking members, and a pressure regulating device for said pressure agent.

TECHNOLOGICAL BACKGROUND

Rail vehicles are generally equipped with service brake and/or parking brake calipers provided with a service brake and/or parking brake cylinder.

This cylinder comprises a brake piston movable under the effect of the action of one or more springs and furthermore movable under the effect of a fluid under pressure.

Generally, the displacement of the brake piston under the effect of the springs leads to a braking action such as the clamping of a brake disk between two linings, or the direct pressure of a block against a vehicle wheel. On the contrary, the displacement of the braking piston under the effect of the fluid under pressure leads to an opposite action to the braking, i.e. the unclamping of the brake disk or the withdrawal of the block; and thereby enables the brake to be let off.

More specifically, this type of braking cylinder may comprise a body in which and relative to which the braking piston is movable to act on the linings or on the block via a thrust rod and a braking linkage, and a cavity formed in the body and provided to receive the springs.

The brake cylinder may further comprise a pressure chamber delimited in particular by the braking piston and by the body, and which is connected by a pipe to a source of pressure agent to return the piston into a resting position in which the brake is set but not applied.

In particular, according to the above operation, to set the brake, the pressure chamber is supplied with pressure agent, also called fluid under pressure, via the corresponding source so as to displace the braking piston in the body. The displacement of the braking piston towards its resting position leads to the displacement of a bearing flange against the load of the spring, which becomes compressed.

For this, rail vehicles are thus equipped with one or more reservoirs forming the source, filled with fluid maintained under pressure for example by a motor-driven pump system, and by at least one fluid pressure regulating device, which is interconnected on the pipe between the reservoir and the brake cylinder.

SUBJECT OF THE INVENTION

The invention concerns a braking system for a rail vehicle of the type described above, that is particularly simple, convenient and economical.

According to a first aspect, the invention thus relates to a rail transport braking system for a rail vehicle having braking members with at least one lining or at least one block, comprising a braking device provided with a cylinder and a piston which is movable relative to said cylinder to act on said braking members, a source of pressure agent configured to supply said braking device with pressure agent and cause said piston to move, and a regulating device disposed between said source and said braking device and configured to control to a predetermined value the pressure value of said pressure agent passing between said regulating device and said braking device;

said rail transport braking system being characterized in that said regulating device comprises a regulating valve provided with a body having a longitudinal main cavity and, opening into said main cavity, a supply channel, a venting channel and a regulating channel located between said supply and venting channels; and a slide having an internal chamber and, opening into said internal chamber, at least one supply port, at least one venting port and at least one regulating port located between said supply and venting ports; said supply and venting ports of said slide each having a general cross-section for passage of said pressure agent substantially having a shape with at least one apex;

said slide being moveably mounted in said main cavity of said body, between a supply position in which said at least one supply port faces said supply channel of said body, and a venting position in which said at least one venting port faces said venting channel of said body;

said regulating device being configured to have a substantially stable regulating configuration, in which said pressure value of said pressure agent passing between said regulating device and said braking device is limited to said predetermined value, and in which said slide is positioned in said main cavity of said body such that said at least one regulating port faces said regulating channel of said body whereas said supply and venting ports are respectively away from said supply and venting channels of said body.

In the braking system according to the invention, the pressure agent flows in the internal chamber and in the ports of the valve slide and also in the channels of the valve body. The combination of such an arrangement with supply and venting ports, of which the general cross-section for passage of the pressure agent substantially has a shape with at least one apex, and with supply and venting ports that are closed (that is to say which do not respectively face the supply and venting channels) when the regulating port or ports are open (that is to say facing the regulating channel), makes it possible both to substantially limit any leakages of pressure agent in the regulating valve and to provide particularly precise regulation, with regard to a predetermined limit value for pressure agent pressure.

It will be noted that the precision of the regulation may be defined and appraised in particular by a satisfactory response time of the valve with regard to application to a rail transport braking system, and in particular by a stability of the regulation over the whole range of useful pressure, that is to say from zero (not included) to the predetermined limit value.

It will be noted that such stability is particularly advantageous for example to operate an anti-skid function of the rail vehicle wheels.

The system according to the invention therefore makes it possible to obtain pressure regulation with particularly good performance, simply, conveniently and economically.

According to preferred, simple, convenient and economical features of the system according to the invention:

said slide has a generally cylindrical shape and is provided with two said supply ports that open to face each other, with two said venting ports that open to face each other and with at least two said regulating ports that open to face each other; at least said supply ports and/or said venting ports having a substantially triangular cross-section for passage;

said slide extends generally longitudinally and has, at a first end, a first well meeting said internal chamber, as well as a first obturating plug connected mechanically and in fluid-tight manner within said first well;

said first obturating plug comprises an outside cavity provided at a remote opposite location from said first well and configured to receive a pushing finger provided to move said slide within said main cavity of said body;

said slide extends generally longitudinally and has, at a second end, a second well meeting said internal chamber, as well as a second obturating plug connected mechanically and in fluid-tight manner within said second well;

said second obturating plug is configured to cooperate with a damping mechanism of said slide, mounted in said main cavity of said body;

said second obturating plug comprises a hole provided at a remote opposite location from said second well and said damping mechanism comprises a reducing rod at least partly inserted into said hole, a damping sleeve bearing against said reducing rod and an elastic return member interposed between said damping sleeve and said second obturating plug;

said longitudinal main cavity provided in said body of said regulating valve opens on both sides of said body;

said body of said regulating valve is provided with a supply pipe opening on a first side of said body and into said supply channel, with a venting pipe opening on a first side of said body and into said venting channel, and with a regulating pipe opening on said first side of said body and into said regulating channel;

said regulating device comprises a manifold forming a fluidic interface between said regulating valve, said braking device and said source of pressure agent; said body of said regulating valve has a first side by which is mounted said regulating valve on said manifold and several openings are formed on said first side to enable fluidic communication between said regulating valve and said manifold;

said regulating device comprises an actuator configured to move said slide in said main cavity of said body according to a control instruction said body of said regulating valve has a second side by which said regulating valve is mounted on said actuator and at least one opening is formed on said second side to enable the movement of said slide within said main cavity of said body;

said regulating device comprises an electrical moving coil linear actuator, configured to receive an electrical control instruction and provided with a pushing finger coming into contact with said slide to move the latter within said main cavity of said body; and/or said pressure agent is a hydraulic fluid.

According to a second aspect, the invention also relates to a regulating device for regulating a pressure agent configured to control to a predetermined value the pressure value of said pressure agent, characterized in that it comprises a regulating valve provided with a body having a longitudinal main cavity and, opening into said main cavity, a supply channel, a venting channel and a regulating channel that is located between said supply and venting channels; and with a slide having an internal chamber and, opening into said internal chamber, at least one supply port, at least one venting port and at least one regulating port located between said supply and venting ports;

said supply and venting ports of said slide each having a general cross-section for passage of said pressure agent substantially having a shape with at least one apex;

said slide being moveably mounted in said main cavity of said body, between a supply position in which said at least one supply port faces said supply channel of said body, and a venting position in which said at least one venting port faces said venting channel of said body;

said regulating device being configured to have a substantially stable regulating configuration, in which said pressure value of said pressure agent is limited to said predetermined value, and in which said slide is positioned in said main cavity of said body such that said at least one regulating port faces said regulating channel of said body whereas said supply and venting ports are respectively away from said supply and venting channels of said body.

According to features of the device according to the invention that are preferred, simple, convenient and economical, said slide extends generally longitudinally and has, at a first end, a first well meeting said internal chamber, as well as a first obturating plug connected mechanically and in fluid-tight manner within said first well, said first obturating plug comprising an outside cavity provided at a remote opposite location from said first well and configured to receive a pushing finger provided to move said slide within said main cavity of said body; and at a second end, a second well meeting said internal chamber, as well as a second obturating plug connected mechanically and in fluid-tight manner within said second well, said second obturating plug comprising a hole provided at a remote opposite location from said second well and which is configured to cooperate with a damping mechanism of said slide, mounted in said main cavity of said body, which damping mechanism comprises a reducing rod at least partly inserted into said hole, a damping sleeve bearing against said reducing rod and an elastic return member interposed between said damping sleeve and said second obturating plug.

BRIEF DESCRIPTION OF THE DRAWINGS

The disclosure of the invention will now be continued with the description of an example embodiment, given below by way of illustrative and non-limiting example, with reference to the accompanying drawings, in which.

DETAILED DESCRIPTION OF AN EMBODIMENT

Figure 1:
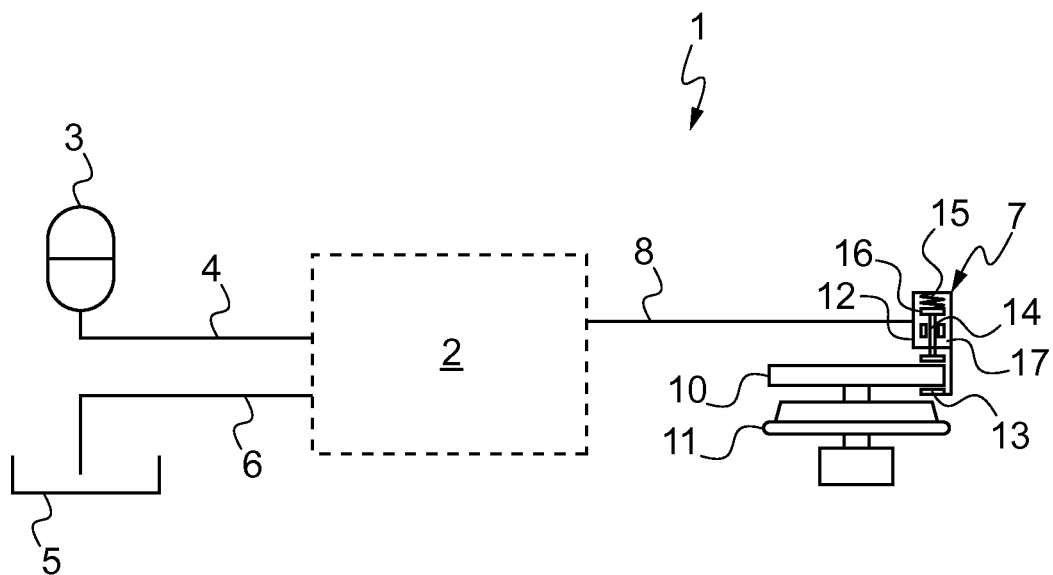
FIG. 1 is a partial diagrammatic representation of a rail transport braking system comprising in particular a service brake mounted on a disk associated with a rail vehicle wheel, a source of pressure agent and a regulating device for regulating the pressure of said pressure agent.
Figure 2:
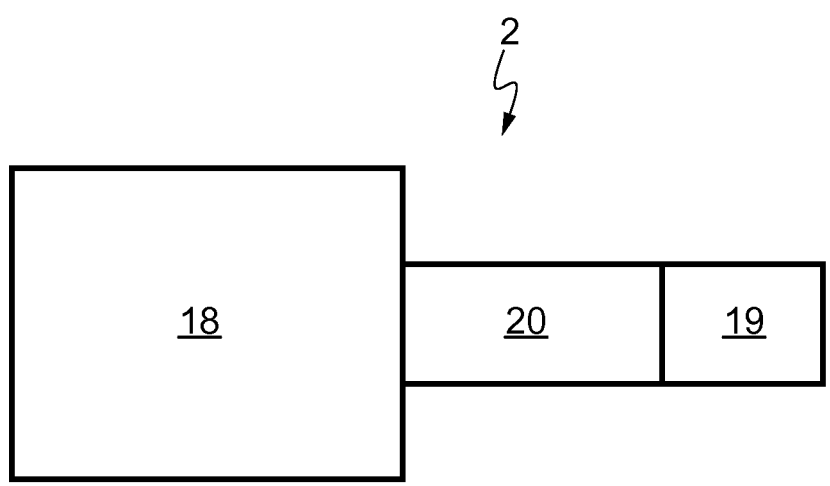
FIG. 2 is a partial diagrammatic representation of the regulating device for regulating the pressure of said pressure agent of FIG. 1, provided in particular with a manifold, with a regulating valve, also called reducer, mounted on the manifold, and with an actuator mounted on the valve.
Figure 3:
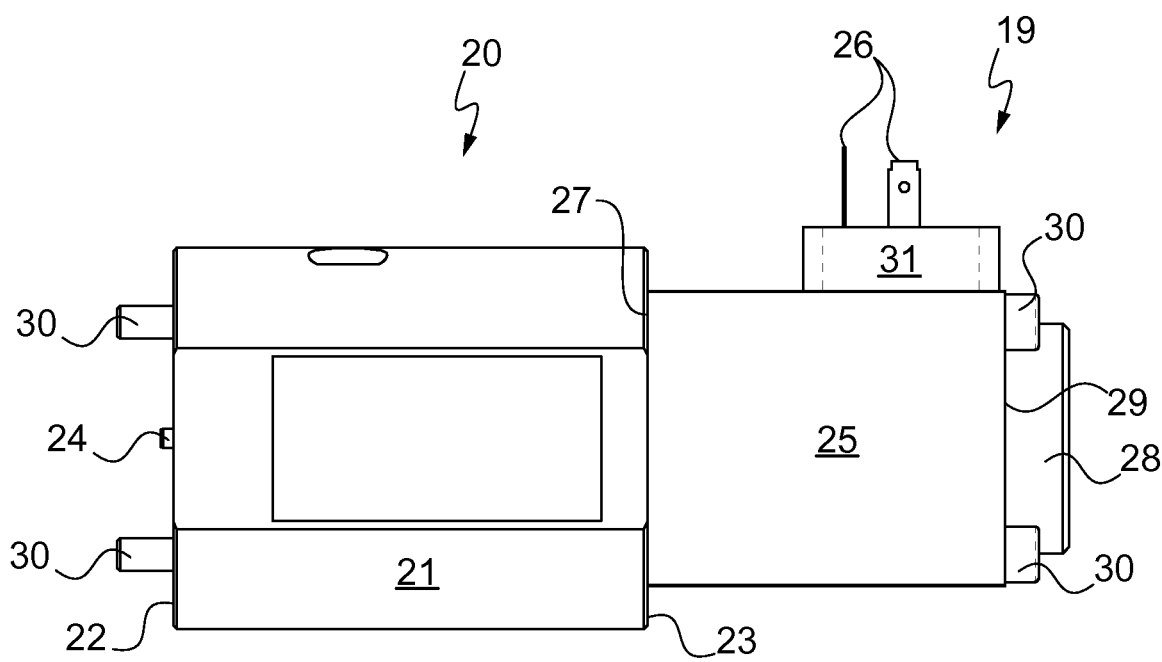
FIGS. 3 and 4 illustrate respectively in plan view and in perspective the regulating valve and the actuator, taken in isolation and assembled.
Figure 4:
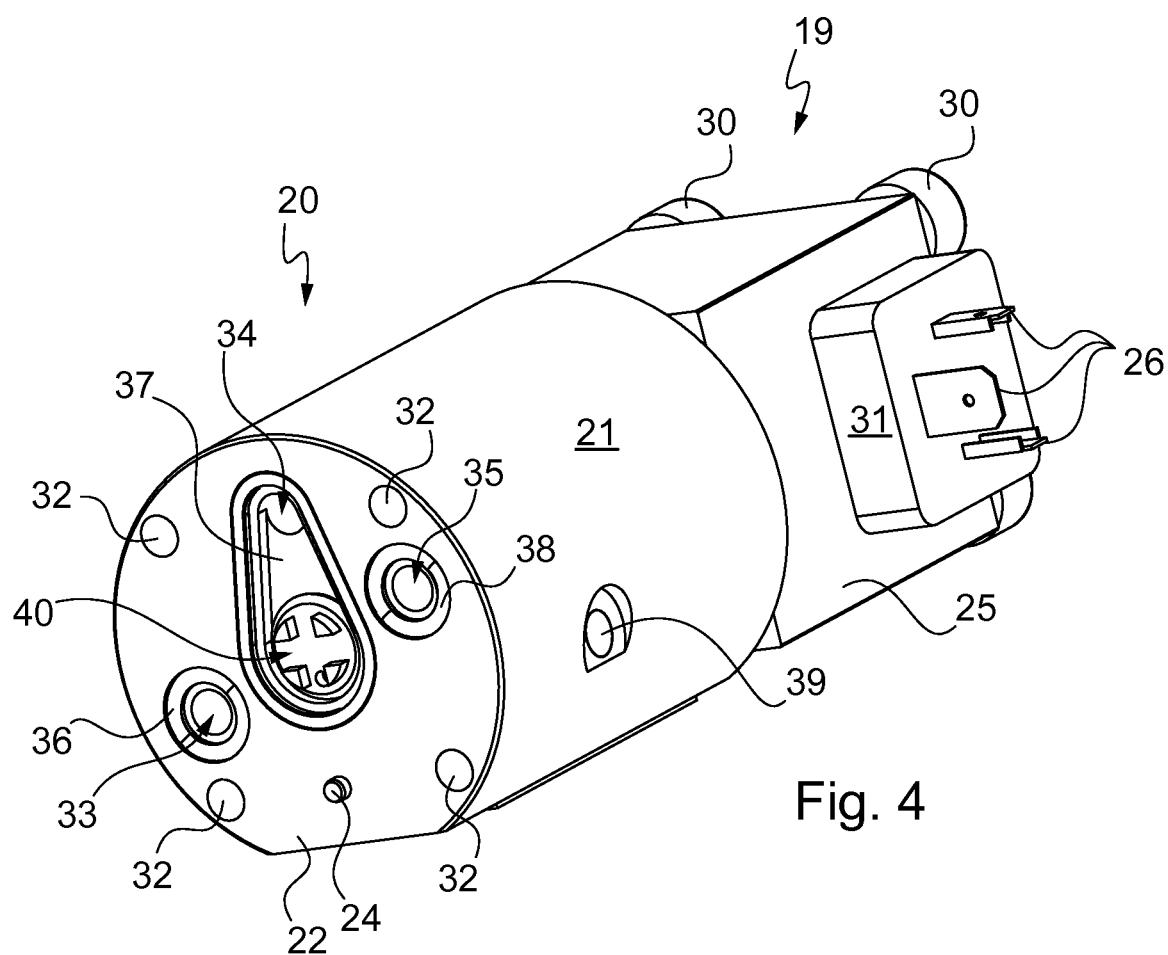
Figure 5:
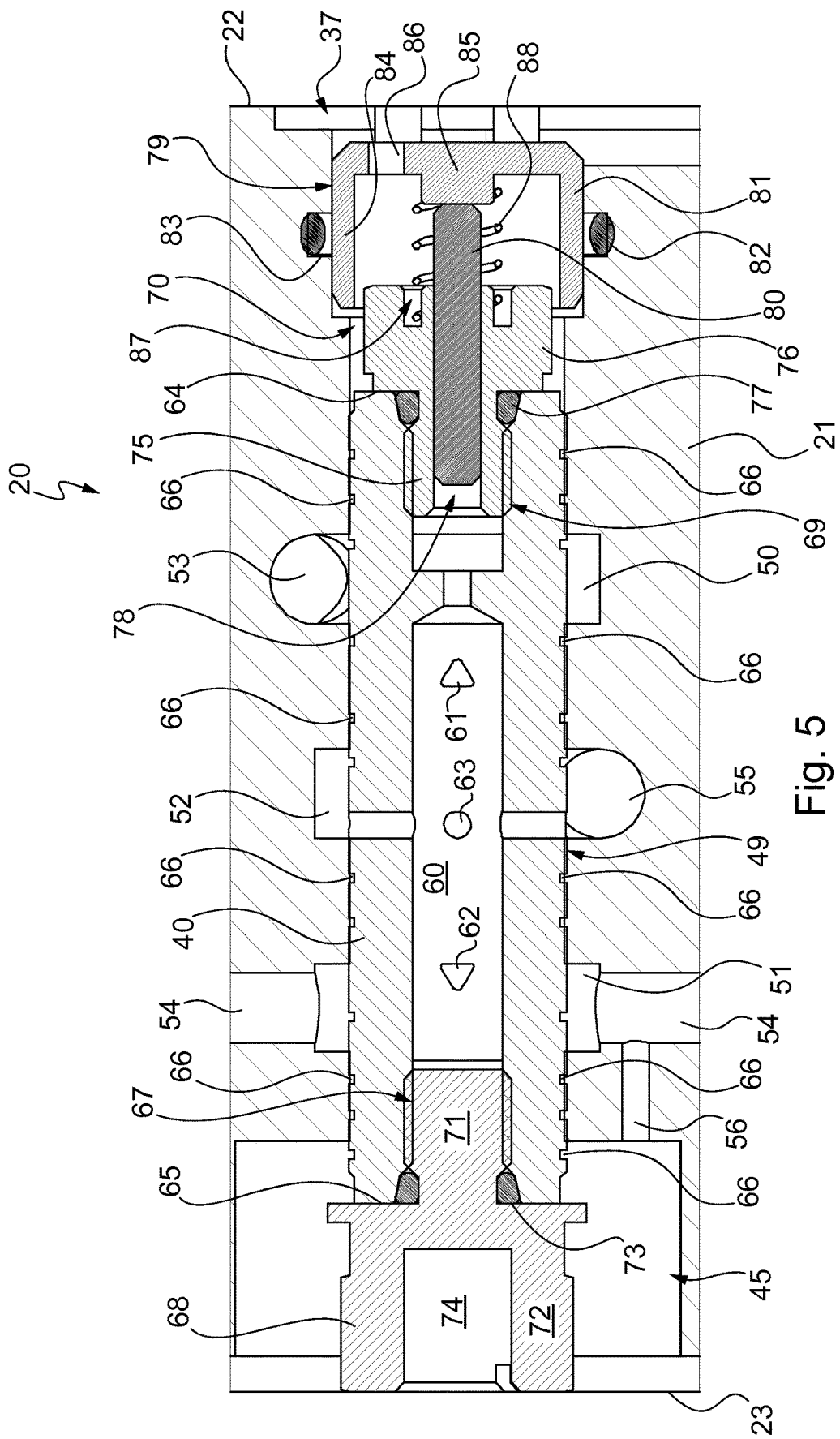
FIG. 5 is a longitudinal median cross-section view of the distribution valve, without the actuator.
Figure 6:
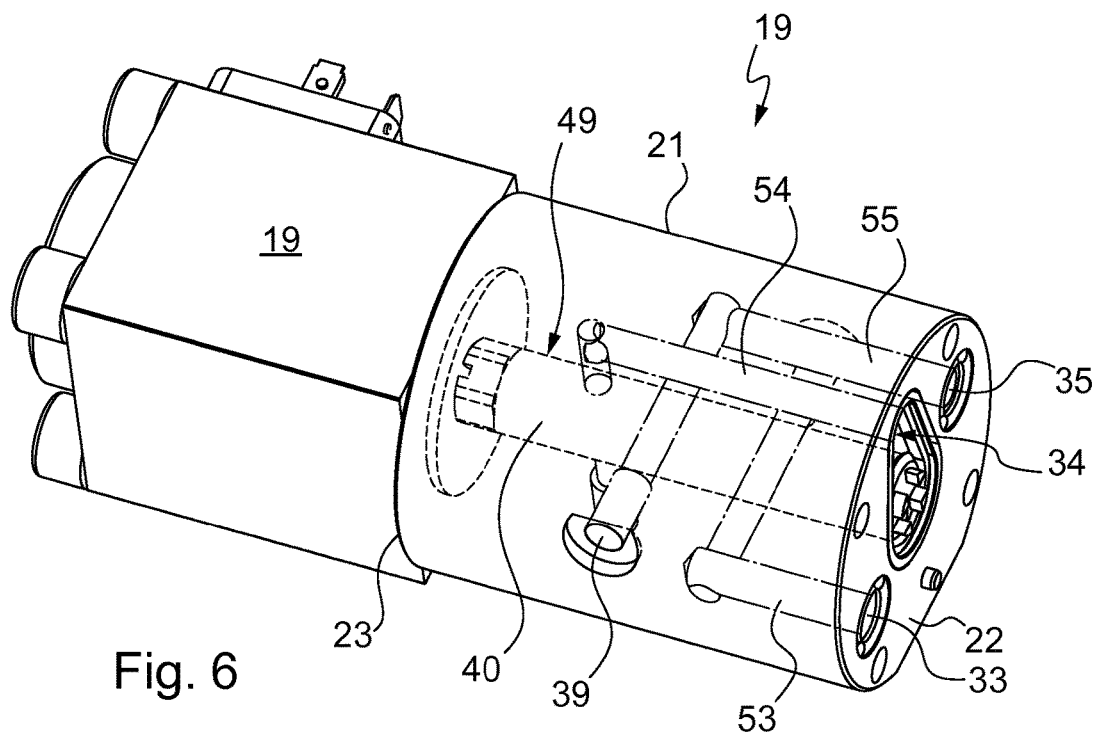
FIGS. 6 and 7 are similar views to that of FIG. 4, but taken from different viewing angles showing pipes, by transparency and diagrammatically with dashed line, that are provided in the valve body and connect the regulating slide, also shown diagrammatically, to orifices also provided in the valve body.
Figure 7:
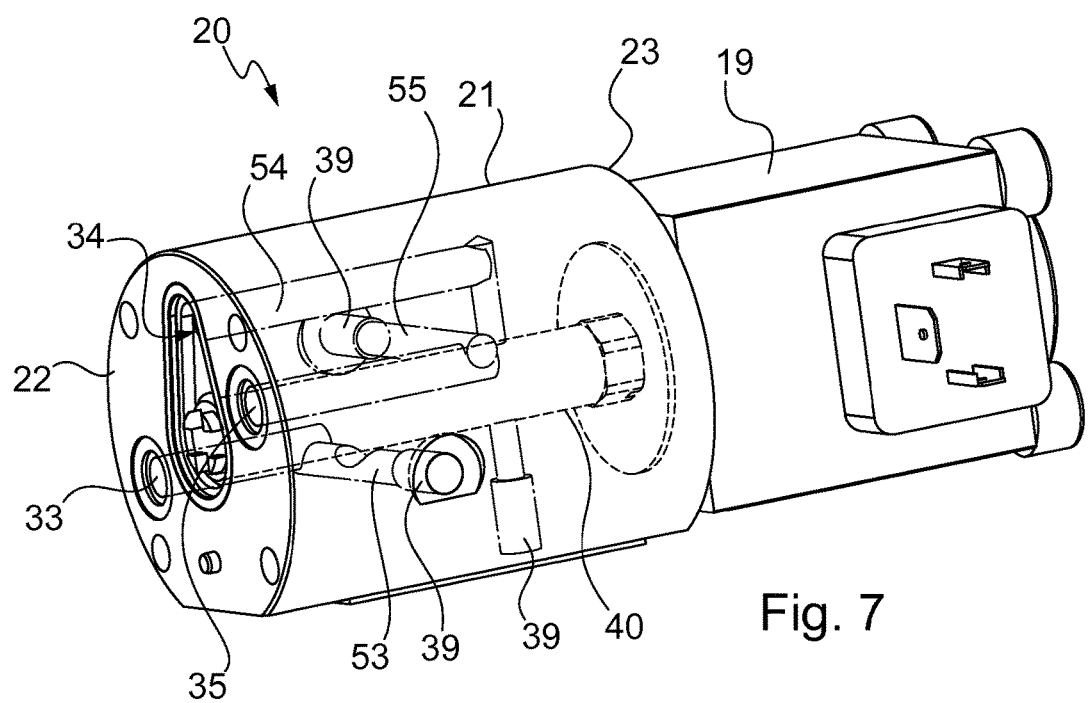
Figure 8:
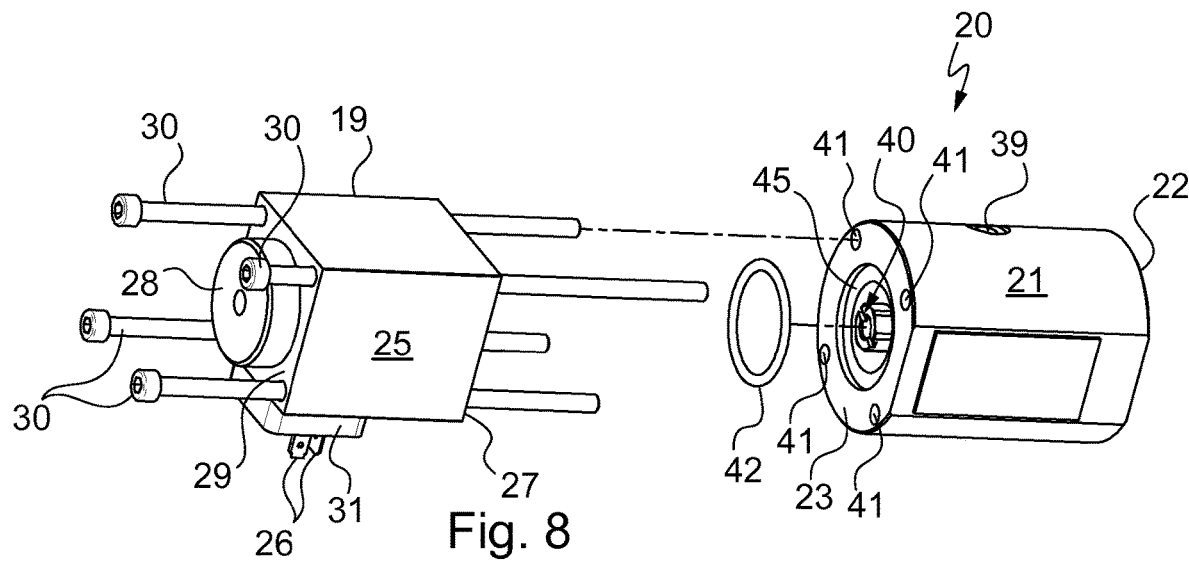
FIG. 8 is a perspective view of the regulating valve and of the actuator, taken in isolation and dismantled.
Figure 9:
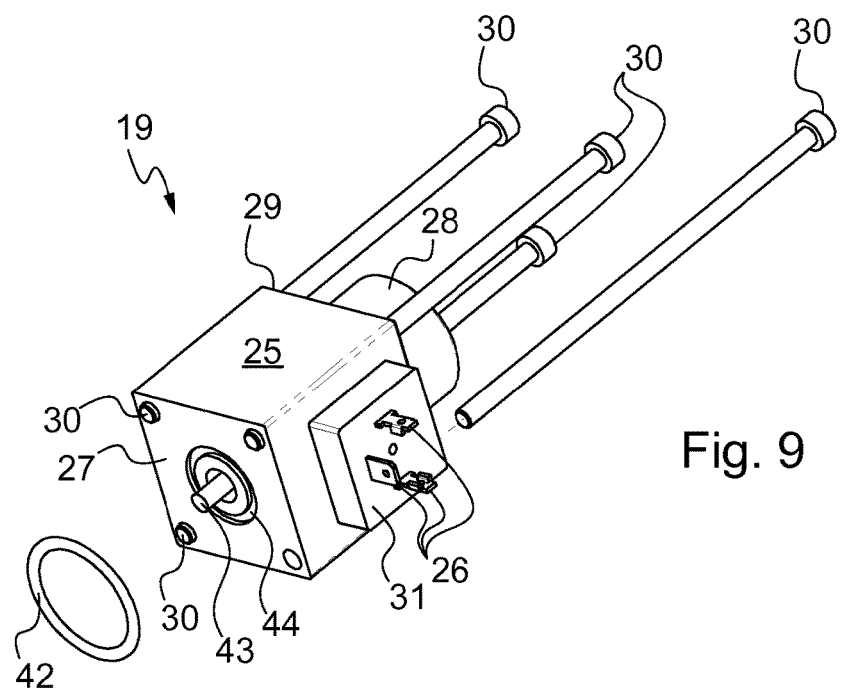
FIG. 9 is an isolated perspective view of the actuator.
Figure 10:
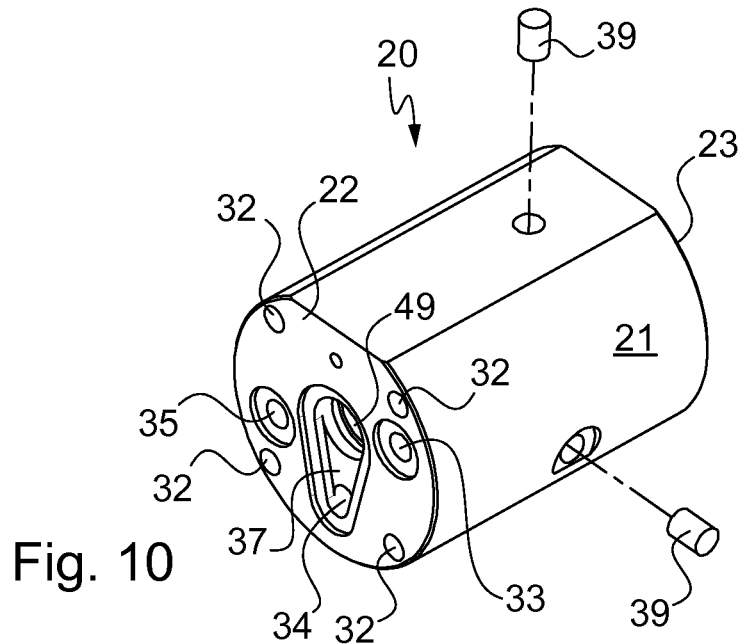
FIGS. 10 and 11 illustrate a body of the regulating valve, in perspective and isolated, taken from different viewing angles.

FIGS. 1 and 2 are partial diagrammatic representations of a rail transport braking system 1 for a rail vehicle (not shown), and a regulating device 2 for a pressure agent comprised by the system 1.

The system 1 further comprises a source of pressure agent, here formed by an accumulator 3, connected to the regulating device 2 by a first pipe 4, a collecting tank 5 also connected to the regulating device 2 by a second pipe 6, and a service brake caliper 7 also connected to the regulating device 2 by a third pipe 8.

The service brake caliper 7 is mounted here on a disk 10 associated a wheel 11 of the rail vehicle.

The service brake caliper 7 (here represented very diagrammatically) is provided with a body 12 forming a service brake cylinder, braking linings 13 mechanically linked to the body 12 via a braking linkage and configured to act on the disk 10.

The body 12 here has the general form of a generally closed envelope. The service brake comprises an actuator which here is formed by a braking piston 14 accommodated in a first cavity provided in the body 12. This braking piston 14 is movable relative to the body 12, in the first cavity, in a first axial direction.

The service brake is furthermore provided with a spring member 15 accommodated in a second cavity provided in the body 12 and with a bearing flange 16 mechanically connected both to the spring member 15 and to the braking piston 14.

The spring member 15 may be formed by one or more compression springs and the bearing flange 16 may for example have the form of a cup in which the spring member 15 is at least partially accommodated.

The bearing flange 16 is mechanically connected to an end of the braking piston 14 via a mechanical linking interface.

The spring member 15 is configured here for placing, without being acted upon externally and via the bearing flange 16 and the interface, the braking piston 14 in a braking position in which the braking linings 13 apply a force on the disk 10, whereby the brake is applied.

Together with the body 12, the braking piston 14 delimits a pressure chamber 17 configured to be supplied by the third pipe 8.

The supply of the pressure chamber 17 with pressure agent under a predetermined pressure here makes it possible to place the braking piston 14 in a position distinct from the braking position, in which the linings do not apply any force on the disk, whereby the brake is not applied.

The pressure agent here is a hydraulic fluid pressurized in the accumulator 3 at a pressure value comprised for example between approximately 110 bars and approximately 150 bars.

The system 1 comprises a motor-driven pump system (not illustrated), configured to keep the hydraulic fluid at a predetermined pressure value, for example here approximately 145 bars, in the accumulator 3.

The supply of the service brake caliper 7 with hydraulic fluid is carried out from the accumulator 3 via the pressure regulating device 2.

The regulating device 2, as diagrammatically illustrated in FIG. 2, comprises a manifold 18, a regulating valve 20, also called pressure reducer, mounted on the manifold 18, and an actuator 19 mounted on the valve 20.

The regulating device 2 is configured to regulate and control the pressure value of the hydraulic fluid coming from the accumulator 3, here at a utilization value equal to approximately 110 bars, in particular for it to be conveyed to the service brake caliper to reach its pressure chamber 17; and/or from that chamber 17 to the collecting tank 5.

The manifold 18 may be formed by a body forming a fluidic interface in which in particular pipes are provided, for the fluidic interconnection of the first, second and third pipes 4, 6 and 8 with the dedicated orifices of the valve 20 (see below).

A description will now be given in detail of the valve 20 and of the actuator 19, in particular with reference to FIGS. 3 to 15.

The regulating valve 20 comprises a body 21 having a cylindrical general shape and extending substantially longitudinally, and a regulating slide 40 inserted into the body 21.

The body 21 has a first side 22 by which is mounted that regulating valve 20 on the manifold 18.

The valve 20 comprises a fool-proofing pin 24 projecting from the first side 22 for its mounting on the manifold.

The body 21 of the valve 20 has a second side 23, which is an opposite side to the first side 22, by which that valve 20 is mounted on the actuator 19 (see below).

The body 21 of the valve 20 has a longitudinal main cavity 49 provided to receive the regulating slide 40 and which opens both on the first side 22 and on the second side 23 of the body 21, thus forming openings on opposite sides of the body 21.

The body 21 of the valve 20 comprises several openings formed on its first side 22 to enable fluidic communication between the regulating valve 20 and the manifold 18.

Figure 18:
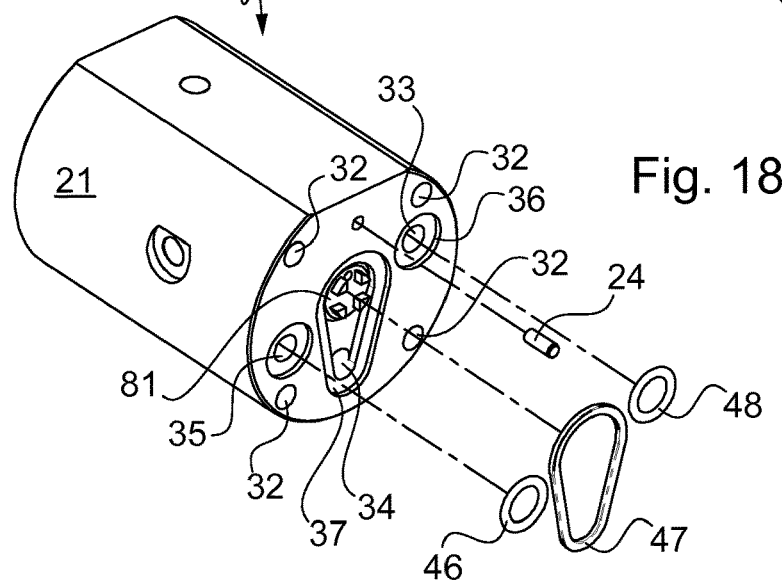

These are in particular a supply opening 33 around which is formed a sealing channel 36 provided to receive an 'O' ring seal 48, a regulating opening 35 around which is formed a sealing channel 38 provided to receive an 'O' ring seal 46, and a venting opening 33 around which is formed a sealing chamber 37 surrounded by an 'O' ring seal 47 (the seals 46, 47 and 48 are shown in FIG. 18).

The body 21 of the valve 20 further comprises through-bores opening at holes 32 on its first side 22 and holes 41 on its second side 23.

The body 21 of the valve 20 is also provided with a supply channel 50, with a venting channel 51 and with a regulating channel 52 located between the supply and venting channels 50 and 51.

These channels 50 to 52 are at least partly annular here and each open into the main cavity 49.

The body 21 of the valve 20 is furthermore provided with a supply pipe 53 opening, at one end, on the first side 22 by the supply opening 33 and, at an opposite end, into the supply channel 50, with a venting pipe 54 opening, at one end, on the first side 22 by the venting opening 34 and, at an opposite end, into the venting channel 51, and with a regulating pipe 55 opening, at one end, on the first side 22 by the regulating opening 35 and, at an opposite end, into the regulating channel 52.

The supply, venting and regulating pipes 53, 54 and 55 are formed in the body by different bores which form orifices which are plugged here with so-called "expander" plugs 39, inserted by force and in fluid-tight manner into the body 21 of the valve 20.

The body 21 of the valve 20 comprises an annular channel forming a first chamber 45 provided on its second side 23, surrounded by an 'O' ring seal 42, and in which is at least partly received the slide 40.

The body 21 of the valve 20 further comprises a first nozzle 56 opening, at one end, into the first chamber 45 and, at an opposite end, into the venting pipe 54.

The regulating slide 40 has a generally cylindrical shape in which is provided an internal chamber 60.

The regulating slide 40 here comprises two supply ports 61, two venting ports 62 and four regulating ports 63 located between the supply and venting ports 61 and 62.

The supply and venting ports 61 and 62 each have a general cross-section for passage of hydraulic fluid substantially having a shape with at least one apex.

The apex of the venting ports 62 is generally directed towards a first end 65 of the slide 40; whereas the apex of the supply ports 61 is generally directed towards a second end 64 of the slide 40, which is an opposite end to its first end 65.

In particular here, the supply and venting ports 61 and 62 are of triangular shape and thus each have three apexes.

As regards the regulating ports 63, these each have a general cross-section for passage of the hydraulic fluid having a circular shape, and are in particular here circle-shaped.

The two supply ports 61 open facing each other in the internal chamber 60, the two venting ports 62 open facing each other in the internal chamber 60, and the four regulating ports open, in pairs, facing each other in the internal chamber 60.

The ports 61, 62 and 63 radially pass through the slide 40 and thus all open into the internal chamber 60.

The slide 40 is furthermore provided, on its outside contour, with a plurality of annular grooves 66 distributed over the length of the slide 40. It will be noted that the slide 40 is mounted moveably in the main cavity 49 of the body 21 of the valve 20 with play that is for example comprised between approximately 6 microns and approximately 8 microns between the outside contour of the slide 40 and the body 21 of the valve 20.

The regulating slide 40 furthermore has, at its first end 65, a first well 67 meeting the internal chamber 60, as well as a first obturating plug 68 connected mechanically and in fluid-tight manner within the first well 64.

The regulating slide 40 also has, at its second end 64, a second well 69 substantially meeting the internal chamber 60 at a remote opposite location from the first well 67, as well as second obturating plug 70 connected mechanically and in fluid-tight manner within the second well 69.

The first and second wells 67 and 69 are each provided with tapped walls and the first and second obturating plugs 68 and 70 are here screwed into the first and second respective wells 67 and 69.

The first obturating plug 68 is provided with a threaded base 71 fixedly inserted into the first well 67, with a head 72 projecting from the base 71 and with a housing 90 provided between the head 72 and the base 71 and in which is housed an 'O' ring seal 73 to seal the mounting of the first obturating plug 68 in the first well 67 of the slide 40.

The first obturating plug 68 comprises an outside cavity 74 provided in the head 72 at a remote opposite location from the base 71 and from the first well 67 and configured to receive a pushing finger 43 of the actuator 19 provided to move the slide 40 within the main cavity 49 of the body 21 of the valve 20.

The second obturating plug 70 is provided with a threaded base 75 fixedly inserted into the second well 69, with a head 76 projecting from the base 75 and with a housing 91 provided between the head 76 and the base 75 and in which is housed an 'O' ring seal 77 to seal the mounting of the second obturating plug 70 in the second well 69 of the slide 40.

The second obturating plug 70 comprises a through hole 78 formed passing through the head 76 and through the base 75, until it opens into the second well 69.

The slide 40 is furthermore provided with a damping mechanism 79 mounted in the main cavity 49 of the body 21 of the valve 20 and configured to cooperate with the second obturating plug 70.

The damping mechanism 79 comprises a reducing rod 80 at least partly inserted into the through hole 78.

The damping mechanism 79 further comprises a damping sleeve 81 forming a cap inserted substantially by force into the main cavity 49 of the body 21 of the valve 20, an 'O' ring seal 82 being accommodated in a channel 83 provided in the body 21 and being interposed between the body and a lateral wall 84 of the damping sleeve 81 to seal the mounting of that sleeve in the body 21 of the valve 20.

The damping sleeve 81 comprises a back wall 85 from which projects the lateral wall 84 and on which comes to bear an end of the reducing rod 80.

The damping sleeve 81 further comprises a vent 86 provided in a back wall 85.

The damping mechanism 79 also comprises an elastic return member 88, here formed by a compression spring, interposed between the back wall 85 of the damping sleeve 81 and the second obturating plug 70.

The second obturating plug 70 is provided with a housing 87 provided in its base 76 at a remote opposite location from its head 75 and from the second well 69, and which receives and partially guides the spring 88.

The damping sleeve 81 further comprises spreader studs 89 projecting from its back wall 85, at a remote opposite location from the second obturating plug 70.

The actuator 19 is here an electrical moving coil linear actuator.

The actuator 19 comprises a generally parallelepiped casing 25 having a first side 27 that comes to bear against the second side 23 of the body 21 of the valve 20 for their assembly, as well as a second side 29, which is an opposite side to the first side 27.

The actuator 19 here comprises bores (not shown) passing longitudinally through the casing 25, and fastening screws 30 inserted into those bores from the second side 29 until they emerge by its first side 27.

The fastening screws 30, of which only the heads can be seen in FIGS. 3, 4, 6 and 7 have a predetermined shank length.

The shanks of the screws 30 may be configured to pass through the body 21 of the valve 20 from its second side 23, by holes 41, until they emerge by its first side 22, via holes 32.

Thus, the fastening screws 30 can enable the assembly of actuator 19 and valve 20 to be fastened to the manifold 18.

The actuator 19 is provided with an electrical connection base 31 fastened to a main wall of the casing which extends between its first and second sides 27 and 29, and electrical connection lugs 26 which project from the base 31.

The actuator 19 comprises an electric coil mainly housed in the casing 25 and in a protuberance 28 projecting from the casing 25 by its second side 29.

The actuator 19 further comprises a pushing finger 43 mechanically connected to the coil and projecting from the casing 25 by its first side 27.

The actuator coil is configured to receive an electrical control instruction via the connection lugs 26 and to cause the pushing finger 43 to move the slide 40 within the main cavity of the body 21 of the valve 20.

The actuator 19 further comprises an annular channel forming a second chamber 44 provided on the first side 27 of the casing 25 to enable the movement of the pushing finger 43.

It will be noted that the actuator 19 and the valve 20 are arranged relative to each other such that the second annular chamber 44 is located facing the first annular chamber 45 of the body 21 of the valve 20, the seal 42 being situated at the interface between the first and second chambers 45 and 44.

Figure 16:
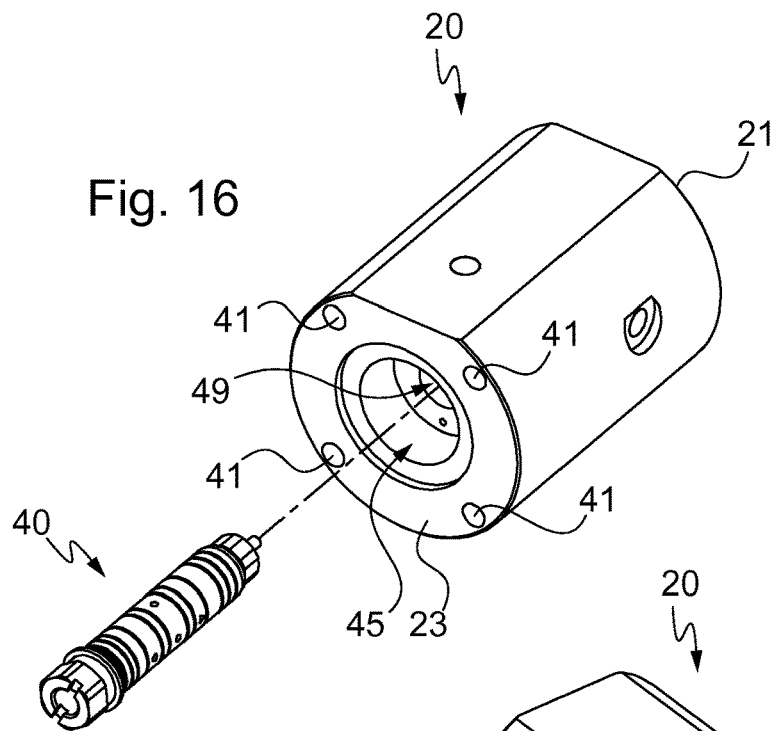
FIGS. 16 through 18 illustrate, in perspective and with different viewing angles, the assembly of the different components of the valve in and on the valve body.
Figure 17:
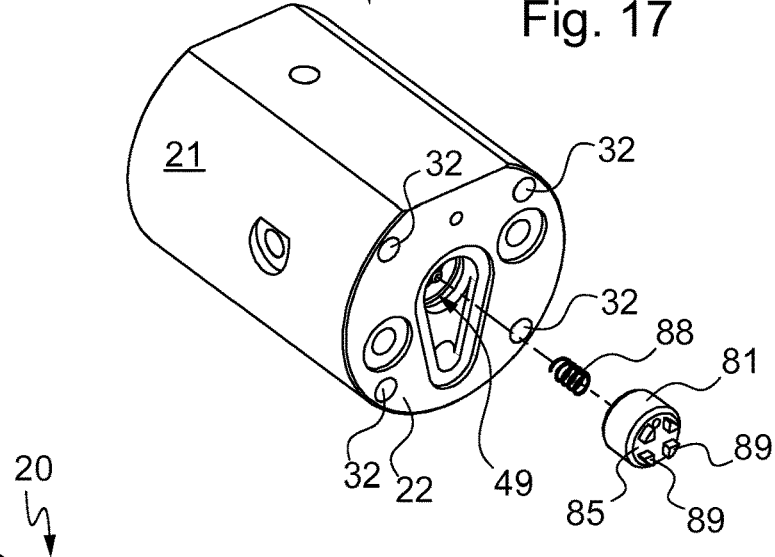

The assembly of the regulating valve 20 is illustrated in particular in FIGS. 16 to 18.

The seal 73 is mounted in the housing 90 between the head 72 and the base 71 of the first obturating plug 68. The base 71 is inserted and screwed into the first well 67 adjacent the first end 65 of the slide 40.

The seal 77 is mounted in the housing 91 between the head 76 and the base 75 of the second obturating plug 70. The reducing rod, here having a diameter approximately equal to 2.6 mm, is inserted through the through hole 78 provided in the second obturating plug 70. The base 75 is inserted and screwed into the second well 69 adjacent the second end 64 of the slide 40.

Figure 11:
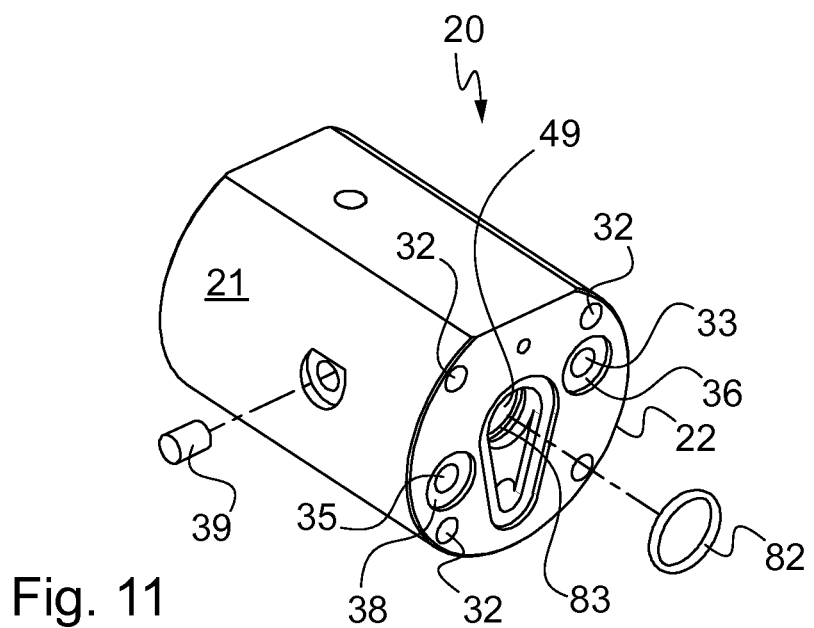
Figure 12:
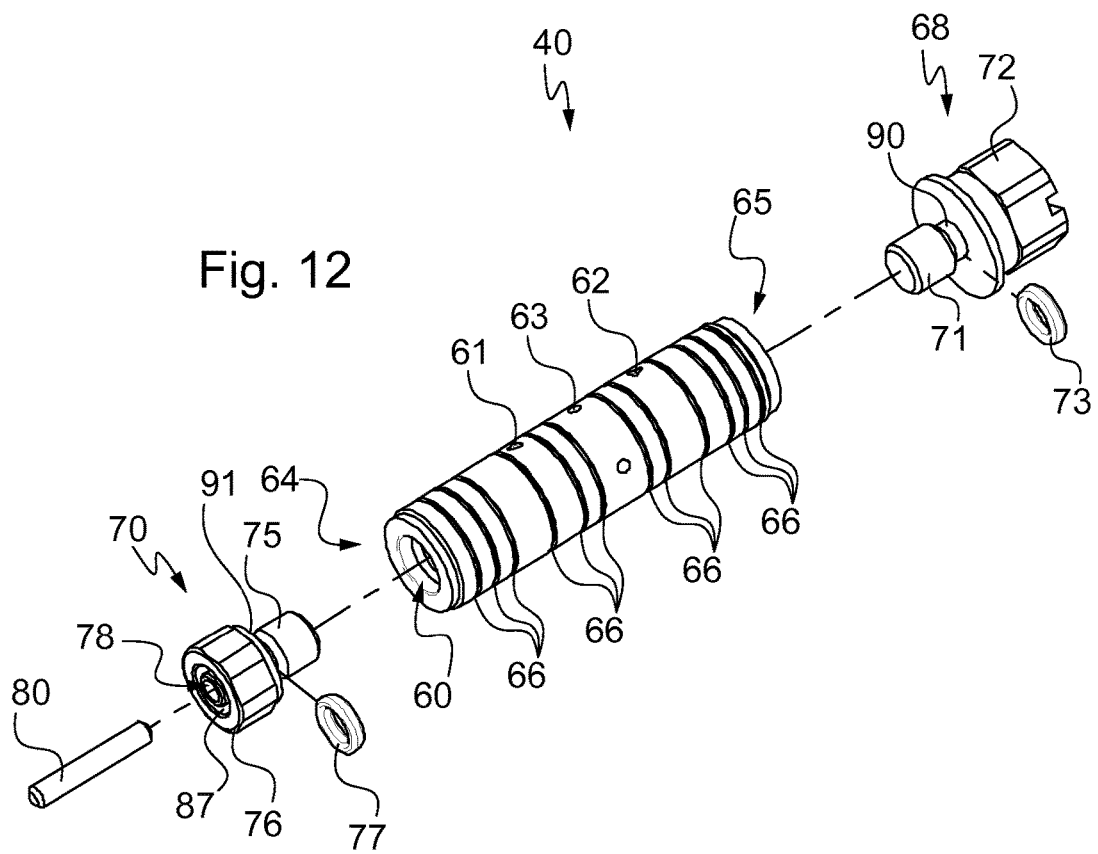
FIG. 12 is an exploded representation in perspective of different components of the valve, that are configured to be mounted inside the illustrated valve body.
Figure 13:
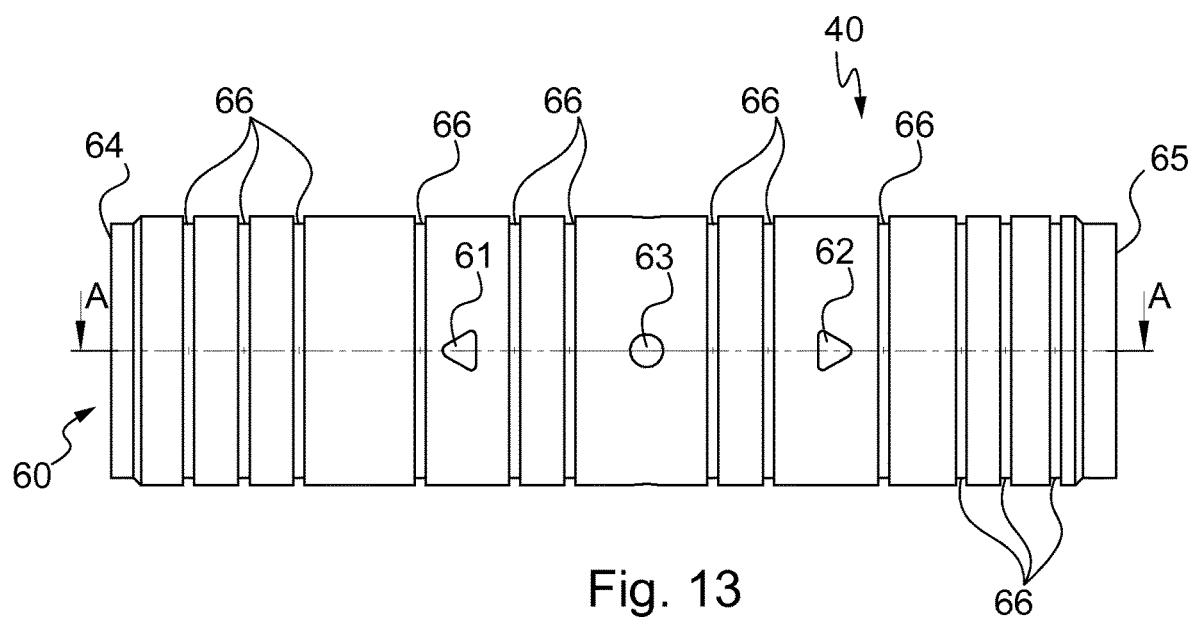
FIGS. 13 and 14 respectively illustrate in plan view and in a section view on A-A of FIG. 13, one of the components visible in FIG. 12, which is a regulating slide.
Figure 14:
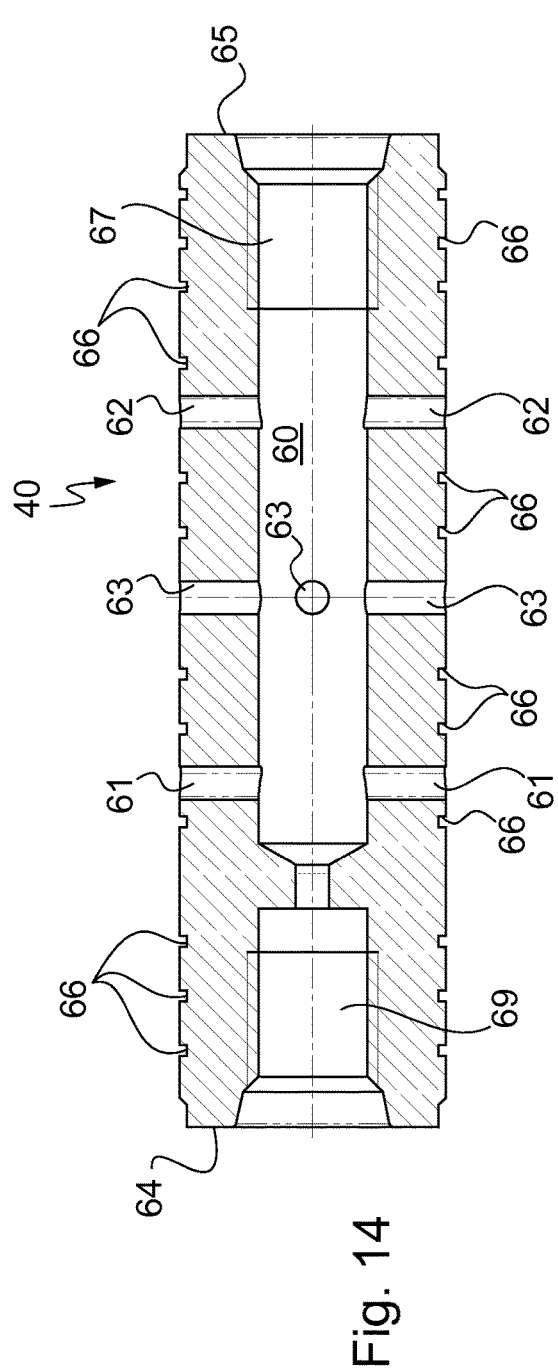
Figure 15:
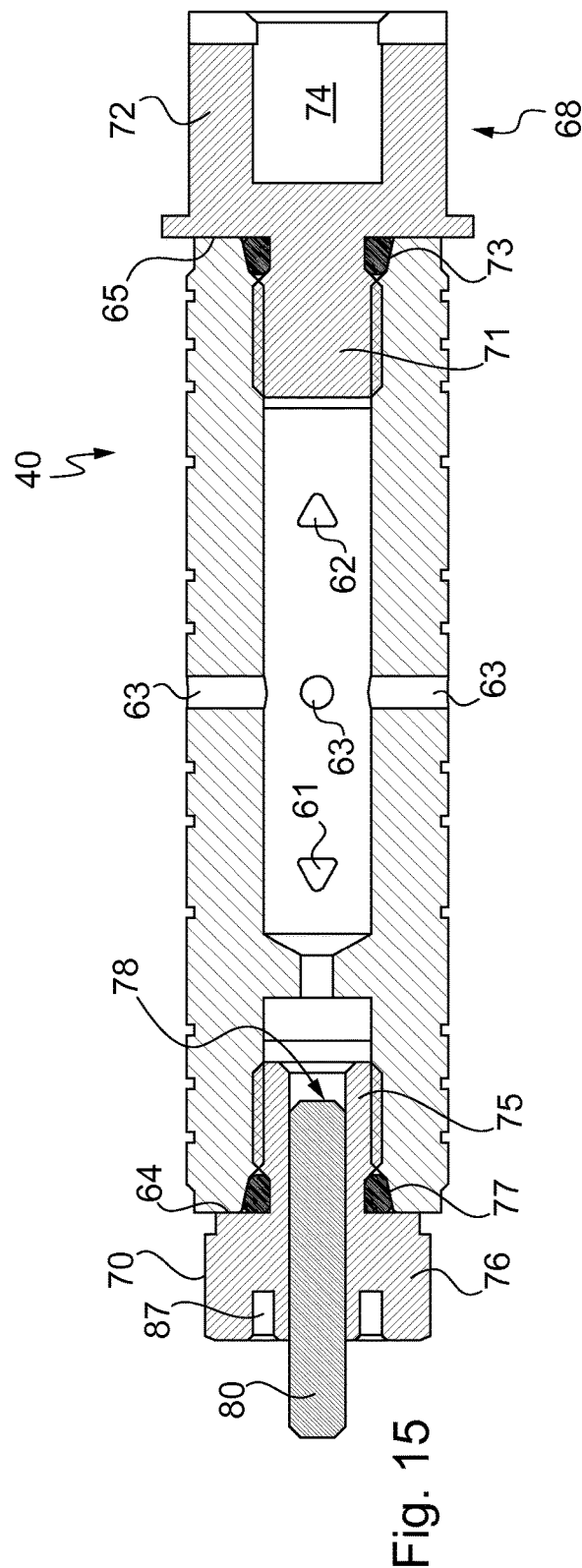
FIG. 15 illustrates the different components visible in FIG. 12, in an assembled state and in medial longitudinal section.

The seal 82 is inserted into the channel 83 provided in the body 21 of the valve 20 by its first side 22 (see FIG. 11).

The slide 40, which here has an outside diameter approximately equal to 12 mm, is inserted into the main cavity 49 of the body 21 of the valve 20, by entering through an opening formed on the second side 23 of the body.

The spring 88 is mounted, by the first side 22 of the body 21, on the reducing rod 80 and partially housed in the housing 87 provided in the base 76 of the second obturating plug 70, at a remote opposite location from its head 75.

The damping sleeve 81 is mounted, by the first side 22 of the body 21, in the main cavity 49 and substantially around the reducing rod 80 and the spring 88 until its back wall 85 comes to bear on the end of the reducing rod 80. The damping sleeve 81 is held in place in the main cavity 49 by the action of the seal 82.

The fool-proofing pin 24 is mounted on the first side 22 of the body 21.

The 'O' ring seals 46 and 48 are housed in respective sealing channels 38 and 36 formed respectively around regulating and supply openings 35 and 33; and the 'O' ring seal 47 is housed around the sealing chamber 37 formed around the venting opening 34.

The regulating valve is thus assembled and the actuator 19 is mounted on the second side 23 of the body 21 of the valve 20, the second annular chamber 44 of the casing 25 of the actuator 19 coming to face the first annular chamber 45 of the body 21 of the valve 20, the seal 42 being sandwiched between the body 21 and the casing 25 at the interface between the first and second chambers 45 and 44, and the pushing finger 43 being received in the outside cavity 74 of the first obturating plug 68.

The valve 20 and the actuator 19 are thus assembled and are mounted on the manifold 18 by the first side 22 of the body 21 of the valve 20.

The fastening screws 30 are installed in the bores passing through the casing 25 of the actuator 19 and of the body 21 of the valve 20 and mechanically connected to the manifold 18 to form a regulating device 2 assembled and mounted in the system 1 shown in FIG. 1.

The arrangement described above enables the slide 40 to be mounted moveably within the main cavity 49 of the body 21, between a supply position in which the supply ports 61 face the supply channel 50 of the body 20, and a venting position in which the venting ports 63 face the venting channel 52 of the body 20.

It will be noted that the slide 40 is moved with the first and second obturating plugs 68 and 76; whereas it is movable relative to the damping mechanism 79, formed by the reducing rod 80, the spring 88 and the sleeve 81.

Furthermore, the arrangement described above makes it possible to provide a regulating device 2 configured to have a substantially stable regulating configuration, in which the pressure value of the hydraulic fluid passing between the valve 20 and the pressure chamber 17 delimited by the piston 14 and the body 12 of the brake caliper 7, is controlled to the predetermined value.

In this configuration, the slide 40 is positioned in the main cavity 49 of the body 20 such that the regulating ports 63 face the regulating channel 52 of the body 20; while the supply and venting ports 61 and 62 are at a distance (and thus do not face) respectively the supply and venting channels 50 and 51 of the body.

As explained above, in the braking system 1, the hydraulic fluid flows within the internal chamber 60 and within the ports 61, 62 and 63 of the slide 40 of the valve 20 and also in the channels 50, 51 and 52 of the body 21 of the valve 20.

The combination of such an arrangement with supply and venting ports 61 and 62, of which the general cross-section for passage of the fluid is triangular, and with supply and venting ports 61 and 62 that are closed (that is to say which do not respectively face the supply and venting channels 50 and 51) when the regulating ports 63 are open (that is to say facing the regulating channel 52), makes it possible both to substantially limit any leakages of the hydraulic fluid in the regulating valve 20 and to provide particularly precise regulation, with regard to a predetermined limit value for hydraulic fluid pressure.

It will be noted that the precision of the regulation may be defined and appraised in particular by a satisfactory response time of the valve 20 with regard to application to the rail transport braking system 1, and in particular by a stability of the regulation over the whole range of useful pressure, that is to say from zero (not included) to the predetermined limit value.

This makes it possible to offer the advantage of maintaining for a longer time a hydraulic fluid pressure comprised between approximately 110 bars and approximately 145 bars in the accumulator 3 and thus rely on the motorized pump system less.

It will also be noted that such stability is particularly advantageous for example to operate an anti-skid function of the rail vehicle wheels.

More specifically, in the example embodiment described above of the braking system 1 and in particular of the service brake caliper 7, when the vehicle requires to be braked or stopped, the service brake is applied via the spring member 15.

In this case, it may be required to reduce the pressure in the pressure chamber 17 or even to vent the hydraulic fluid (zero pressure).

The actuator 19 receives a determined control instruction and the pushing finger 43 moves the slide 40 within the body 21 such that the venting ports 62 come to face the venting channel 51.

The hydraulic fluid passes from the caliper 7 by the pipe 8, between the valve 20 by its regulating opening 35, passes within the regulating pipe 55, within the regulating channel 52, within the regulating ports 63, within the internal chamber 60, then within the venting ports 62, within the venting channel 51, within the venting pipe 54 until it enters the sealing chamber 37 at the location of the venting opening 34 before flowing to reach the collection tank 5 via the pipe 6.

It will be noted that the triangle shape of the venting ports 62 makes it possible to reduce the pressure of the fluid in quite a linear and therefore stable way. In particular, the fluidic communication between the ports 62 and the channel 51 is made by virtue of a changing cross-section.

When the hydraulic fluid pressure is attained in the caliper 7, the actuator moves the slide into its substantially stable configuration in which the regulating ports 63 face the regulating channel 52 of the body 20; while the supply and venting ports 61 and 62 are respectively at a distance from (and therefore do not face) the supply and venting channels 50 and 51 of the body.

On the contrary, in the example embodiment described above of the braking system 1 and in particular of the service brake caliper 7, when the vehicle requires to be accelerated after an instance of braking, the spring member 15 requires to be unapplied.

In this case, it may be required to increase the pressure in the pressure chamber 17.

The actuator 19 receives a determined control instruction and the pushing finger 43 moves the slide 40 within the body 21 such that the supply ports 61 come to face the supply channel 50.

The hydraulic fluid passes from the source 3 via the pipe 4, between the valve 20 by the supply opening 33, passes within the supply pipe 53, within the supply channel 50, within the supply ports 61, within the internal chamber 60, then within the regulating ports 63, within the regulating channel 52, within the regulating pipe 55 until it exits by the regulating opening 35 before supplying the pressure chamber 17 of the caliper 7 via the pipe 8.

As above, it will be noted that the triangle shape of the supply ports 61 makes it possible to raise the pressure of the fluid in quite a linear and therefore stable way. In particular, the fluidic communication between the ports 61 and the channel 52 is made by virtue of a changing cross-section.

When the hydraulic fluid pressure is attained in the caliper 7, the actuator moves the slide into its substantially stable configuration in which the regulating ports 63 face the regulating channel 52 of the body 20; while the supply and venting ports 61 and 62 are respectively at a distance from (and therefore do not face) the supply and venting channels 50 and 51 of the body.

In a variant not illustrated, the brake caliper is able to function in the opposite way to the description given above. In particular, the brake can be applied by the action of the piston via the filling of the pressure chamber with pressurized fluid at its predetermined limit pressure value; while the brake can be unapplied by the action of the spring member and thus by reducing the pressure of the fluid in the pressure chamber. The regulating device is configured to be used according to such operation of the braking device.

In other variants not illustrated, the supply ports and/or the venting ports are not formed by a single aperture of triangular shape but rather by a plurality of orifices that are triangular, or circular, or for instance rectangular, provided that the general cross-section for passage which they delimit has at least one apex as described above.

The regulating ports may also have a general cross-section for passage having a shape substantially having at least one apex.

In still other variants not illustrated:
the slide is provided with more or fewer supply and/or regulating and/or venting ports;
the slide has no damping mechanism, but instead comprises an obturating plug without a through hole;
the slide has no annular groove;
the valve body has no lateral groove forming an annular chamber, only the actuator having such a chamber; or conversely the actuator has no such chamber, only the valve body being provided with a lateral groove forming an annular chamber;
the supply, venting and regulating openings and pipes have a different arrangement to that described above; for example, the openings are open partly or wholly on the periphery of the body rather than the first side of the body;
the sleeve and the main cavity of the valve body are not cylindrical but instead rectangular or hexagonal;
the actuator is not electrical but instead mechanical, or hydraulic or for example pneumatic; and/or
the fluid is not hydraulic but instead gaseous.

It should be noted more generally that the invention is not limited to the examples described and represented.

The invention claimed is:
1. A braking system for a rail vehicle having braking members with at least one lining or at least one block, the braking system comprising:
a regulating device disposed between (a) a braking device having a cylinder and piston that is moveable relative to the cylinder to act on the braking members and (b) a source of pressure agent configured to supply the braking device with a pressure agent to cause the piston to move, the regulating device configured to control a pressure value of the pressure agent passing between the regulating device and the braking device to a predetermined value,
the regulating device comprising a regulating valve provided with a body having a longitudinal main cavity and, opening into the main cavity, a supply channel, a venting channel and a regulating channel located between the supply channel and the venting channel, the regulating device also comprising a slide having an internal chamber and at least one supply port opening into the internal chamber, at least one venting port opening into the internal chamber, and at least one regulating port opening into the internal chamber and located between the at least one supply port and the at least one venting port; the at least one supply port and the at least one venting port of the slide each having a general cross-section for passage of the pressure agent substantially having a shape with at least one apex;
the slide being moveably mounted in the main cavity of the body between a supply position in which the at least one supply port faces the supply channel of the body, and a venting position in which the at least one venting port faces the venting channel of the body;

the regulating device configured to have a substantially stable regulating configuration in which the pressure value of the pressure agent passing between the regulating device and the braking device is limited to the predetermined value, and in which the slide is positioned in the main cavity of the body such that the at least one regulating port faces the regulating channel of the body whereas the at least one supply port and the at least one venting port are respectively away from the supply channel and the venting channel of the body.

2. The system according to claim 1, wherein the slide has a generally cylindrical shape and is provided with two of the at least one supply port that open to face each other, with two of the at least one venting ports that open to face each other and with at least two of the regulating port that open to face each other; at least the supply ports and/or the venting ports having a substantially triangular cross-section for passage.

3. The system according to claim 1, wherein the slide extends generally longitudinally and has, at a first end, a first well meeting the internal chamber and a first obturating plug connected mechanically and in fluid-tight manner within the first well.

4. The system according to claim 3, wherein the first obturating plug comprises an outside cavity provided at a remote opposite location from the first well and configured to receive a pushing finger provided to move the slide within the main cavity of the body.

5. The system according to claim 1, wherein the slide extends generally longitudinally and has, at a second end, a second well meeting the internal chamber and a second obturating plug connected mechanically and in fluid-tight manner within the second well.

6. The system according to claim 5, wherein the second obturating plug is configured to cooperate with a damping mechanism of the slide mounted in the main cavity of the body.

7. The system according to claim 6, wherein the second obturating plug comprises a hole provided at a remote opposite location from the second well and the damping mechanism comprises a reducing rod at least partly inserted into the hole, a damping sleeve bearing against the reducing rod, and an elastic return member interposed between the damping sleeve and the second obturating plug.

8. The system according to claim 1, wherein the longitudinal main cavity provided in the body of the regulating valve opens on both sides of the body.

9. The system according to claim 1, wherein the body of the regulating valve is provided with a supply pipe opening on a first side of the body and into the supply channel with a venting pipe opening on a first side of the body and into the venting channel, and a regulating pipe opening on the first side of the body and into the regulating channel.

10. The system according to claim 1, wherein the regulating device comprises a manifold forming a fluidic interface between the regulating valve, the braking device, and the source of the pressure agent; the body of the regulating valve having a first side by which the regulating valve is mounted on the manifold with several openings formed on the first side to enable fluidic communication between the regulating valve and the manifold.

11. The system according to claim 1, wherein the regulating device comprises an actuator configured to move the slide in the main cavity of the body according to a control instruction; the body of the regulating valve having a second side by which the regulating valve is mounted on the actuator and at least one opening is formed on the second side to enable movement of the slide within the main cavity of the body.

12. The system according to claim 1, wherein the regulating device comprises an electrical moving coil linear actuator configured to receive an electrical control instruction and provided with a pushing finger coming into contact with the slide to move the slide within the main cavity of the body.

13. The system according to claim 1, wherein the pressure agent is a hydraulic fluid.

14. The system according to claim 3, wherein the slide extends generally longitudinally and has, at a first end, a first well meeting the internal chamber, as well as a first obturating plug connected mechanically and in fluid-tight manner within the first well.

15. The system according to claim 2, wherein the slide extends generally longitudinally and has, at a second end, a second well meeting the internal chamber, as well as a second obturating plug connected mechanically and in fluid-tight manner within the second well.

16. The system according to claim 3, wherein the slide extends generally longitudinally and has, at a second end, a second well meeting the internal chamber, as well as a second obturating plug connected mechanically and in fluid-tight manner within the second well.

17. The system according to claim 4, wherein the slide extends generally longitudinally and has, at a second end, a second well meeting the internal chamber, as well as a second obturating plug connected mechanically and in fluid-tight manner within the second well.

18. The system according to claim 2, wherein the longitudinal main cavity provided in the body of the regulating valve opens on both sides of the body.

19. A regulating device for regulating a pressure agent configured to control a pressure value of the pressure agent to a predetermined value, the regulating device comprising:
a regulating valve provided with a body having a longitudinal main cavity and, opening into the main cavity, a supply channel, a venting channel, and a regulating channel that is located between the supply channel and the venting channel; and with a slide having an internal chamber and, opening into the internal chamber, at least one supply port, at least one venting port, and at least one regulating port located between the at least one supply port and the at least one venting port;

the at least one supply port and the at least one venting port of the slide each having a general cross-section for passage of the pressure agent substantially having a shape with at least one apex;

the slide being moveably mounted in the main cavity of the body between a supply position in which the at least one supply port faces the supply channel of the body, and a venting position in which the at least one venting port faces the venting channel of the body;

the regulating device configured to have a substantially stable regulating configuration, in which the pressure value of the pressure agent is limited to the predetermined value, and in which the slide is positioned in the main cavity of the body such that the at least one regulating port faces the regulating channel of the body whereas the at least one supply port and the at least one venting port are respectively away from the supply channel and the venting channel of the body.

20. The regulating device for regulating the pressure agent according to claim 19, wherein the slide extends generally longitudinally and has, at a first end, a first well meeting the internal chamber, as well as a first obturating plug connected mechanically and in fluid-tight manner within the first well, the first obturating plug comprising an outside cavity provided at a remote opposite location from the first well and configured to receive a pushing finger provided to move the slide within the main cavity of the body; and at a second end, a second well meeting the internal chamber, as well as a second obturating plug connected mechanically and in fluid-tight manner within the second well, the second obturating plug comprising a hole provided at a remote opposite location from the second well and which is configured to cooperate with a damping mechanism of the slide, mounted in the main cavity of the body, which damping mechanism comprises a reducing rod at least partly inserted into the hole, a damping sleeve bearing against the reducing rod, and an elastic return member interposed between the damping sleeve and the second obturating plug.

* * * * *